US010369070B2

(12) United States Patent
Roh et al.

(10) Patent No.: US 10,369,070 B2
(45) Date of Patent: Aug. 6, 2019

(54) MOTION ASSISTIVE APPARATUS AND METHOD OF CONTROLLING THE SAME

(71) Applicant: Samsung Electronics Co., Ltd., Suwon-Si, Gyeonggi-Do (KR)

(72) Inventors: Kyung Shik Roh, Seongnam-si (KR); Young Do Kwon, Yongin-si (KR); Young Bo Shim, Seoul (KR); Jeong-heon Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 702 days.

(21) Appl. No.: 14/582,339

(22) Filed: Dec. 24, 2014

(65) Prior Publication Data

US 2015/0182408 A1  Jul. 2, 2015

(30) Foreign Application Priority Data

Dec. 30, 2013 (KR) .................. 10-2013-0166515

(51) Int. Cl.
*B25J 9/00* (2006.01)
*A61H 3/00* (2006.01)
(Continued)

(52) U.S. Cl.
CPC .............. *A61H 3/00* (2013.01); *A61H 1/024* (2013.01); *A61H 1/0244* (2013.01);
(Continued)

(58) Field of Classification Search
CPC ........ A61H 3/00; A61H 1/024; A61H 1/0244; A61H 2201/5038; A61H 2201/1215;
(Continued)

(56) References Cited

U.S. PATENT DOCUMENTS 4,903,192 A * 2/1990 Saito .................. G05B 13/0275
700/37
5,961,541 A 10/1999 Ferrati
(Continued)

FOREIGN PATENT DOCUMENTS

CN  101926772 A  12/2010
EP  1260201 A1  11/2002
(Continued)

OTHER PUBLICATIONS

European Search Report dated Jun. 16, 2015 for EP Application No. 14 20 0030.
(Continued)

*Primary Examiner* — Colin W Stuart
*Assistant Examiner* — Douglas Y Sul
(74) *Attorney, Agent, or Firm* — Harness, Dickey & Pierce, L.L.C.

(57) ABSTRACT

A motion assistive apparatus may include a receiver allowing a user to intuitively adjust performance of the motion assistive apparatus and a method of controlling the same. The motion assistive apparatus may include a receiver provided to adjust variable characteristics of the motion assistive apparatus, a processor to adjust a variable parameter related to adjustment of the variable characteristics, in response to adjustment of the variable characteristics through the receiver, and an actuator to output changed assist power in response to adjustment of the variable parameter to change the variable characteristics.

24 Claims, 11 Drawing Sheets

(51) Int. Cl.
*A61H 1/02* (2006.01)
*B25J 9/16* (2006.01)

(52) U.S. Cl.
CPC ........... *B25J 9/0006* (2013.01); *B25J 9/1628* (2013.01); *A61H 2201/1215* (2013.01); *A61H 2201/1246* (2013.01); *A61H 2201/165* (2013.01); *A61H 2201/501* (2013.01); *A61H 2201/5007* (2013.01); *A61H 2201/5035* (2013.01); *A61H 2201/5038* (2013.01); *A61H 2201/5046* (2013.01); *A61H 2201/5061* (2013.01); *A61H 2201/5069* (2013.01); *A61H 2201/5079* (2013.01); *A61H 2201/5084* (2013.01); *G05B 2219/40305* (2013.01)

(58) Field of Classification Search
CPC . A61H 2201/165; B25J 9/1628; B25J 9/0006; G05B 2219/40305
See application file for complete search history.

(56) References Cited

U.S. PATENT DOCUMENTS

| | | | |
|---|---|---|---|
| 2003/0115031 A1* | 6/2003 | Dariush | G06F 19/3437 703/11 |
| 2008/0009771 A1 | 1/2008 | Perry et al. | |
| 2008/0071386 A1 | 3/2008 | McBean et al. | |
| 2008/0161937 A1* | 7/2008 | Sankai | A61H 3/008 623/25 |
| 2009/0036815 A1* | 2/2009 | Ido | A61H 1/0237 602/23 |
| 2011/0004322 A1 | 1/2011 | Sankai | |
| 2012/0095373 A1* | 4/2012 | Hirata | A61H 1/0244 601/35 |
| 2013/0006159 A1* | 1/2013 | Nakashima | A61H 1/024 602/23 |
| 2013/0158445 A1* | 6/2013 | Kazerooni | A61H 3/00 601/35 |

FOREIGN PATENT DOCUMENTS

| | | |
|---|---|---|
| JP | 2004-114292 A | 4/2004 |
| JP | 2009095427 A | 5/2009 |
| JP | 2010110564 A | 5/2010 |
| JP | 2011239887 A | 12/2011 |
| JP | 2012135486 A | 7/2012 |
| WO | WO-2012027336 A1 | 3/2012 |

OTHER PUBLICATIONS

European Search Report dated Apr. 20, 2017 for corresponding EP Application No. 14 200 030.6.
Final Rejection dated Aug. 7, 2018 by the Japan Patent Office for Japanese Patent Application No. 2014-245042.
Second Office Action issued by the State Intellectual Property Office of P.R. China dated Sep. 14, 2018 for Application No. 201410849311. 5.
Office Action issue by the State Intellectual Property Office of P.R. China dated Dec. 22, 2017 for CN Application No. 201410849311. 5.
Office Action issued by the Japanese Patent Office dated Jan. 30, 2018 for JP Application No. 2014-245042.
European Patent Office Communication dated Jan. 22, 2019 relating to EP Application No. 14 200 030.6.
Chinese Office Action dated Apr. 23, 2019 for Chinese Application No. 201410849311.5 (with English translation).

* cited by examiner

MOTION ASSISTIVE APPARATUS AND METHOD OF CONTROLLING THE SAME

CROSS-REFERENCE TO RELATED APPLICATION(S)

This application claims the benefit of Korean Patent Application No. 2013-0166515, filed on Dec. 30, 2013 in the Korean Intellectual Property Office, the entire disclosure of which is incorporated herein by reference.

BACKGROUND

1. Field

Example embodiments relate to an motion assistive apparatus and/or a method of controlling the same.

2. Description of the Related Art

An motion assistive apparatus is a mechanism that may assist users suffering from inconvenience in walking to allow the users to more easily walk. Users may undergo inconvenience in walking for congenital reasons such as genetic deficiencies or acquired reasons such as age, diseases and accidents. The motion assistive apparatus may address such inconvenience in walking.

Examples of the motion assistive apparatuses include an assistive walking vehicle provided with at least one wheel and a supporter, and an assistive walking robot that applies force required for walking to the muscles of a human body to assist the user in walking.

The assistive walking robot may be fixed to the hip, femoral region or shin of a human body to assist the muscles and joints of the user in moving by applying assistive force such as rotary force facilitating movement of muscles and joints through an actuator and various mechanical means. The assistive walking robot may allow the user to more easily walk.

SUMMARY

Example embodiments are related to an motion assistive apparatus and a method of controlling the same. In some example embodiments, the motion assistive apparatus may include a receiver allowing a user to intuitively adjust performance of the motion assistive apparatus.

Additional aspects of the example embodiments will be set forth in part in the description which follows and, in part, will be obvious from the description, or may be learned by practice of the same.

In accordance with some example embodiments, the motion assistive apparatus may include a receiver provided to adjust variable characteristics of the motion assistive apparatus, a processor to adjust a variable parameter related to adjustment of the variable characteristics, in response to adjustment of the variable characteristics through the receiver, and an actuator to output changed assist power in response to adjustment of the variable parameter to change the variable characteristics.

In accordance with other example embodiments, the motion assistive apparatus may include a receiver provided with a user interface to adjust variable characteristics of the motion assistive apparatus, the variable characteristics including at least one of a magnitude of assist power, a response speed of the motion assistive apparatus, and motion smoothness of the motion assistive apparatus, and an actuator to output changed assist power to change the variable characteristics in response to adjustment of the variable characteristics through the user interface.

In accordance with other example embodiments, the method of controlling an motion assistive apparatus may include receiving an adjustment command to adjust variable characteristics through a receiver, a processor adjusting a variable parameter related to adjustment of the variable characteristics, in response to the adjustment command to adjust the variable characteristics, and an actuator outputting changed assist power in response to adjustment of the variable parameter.

In accordance with other example embodiments, the motion assistive apparatus may be configured to generate an assist power to assist a user thereof with walking.

In some example embodiments, the motion assistive apparatus may include a processor configured to adjust characteristics associated with the assist power provided to the user by the motion assistive apparatus based on an input received from the user.

In some example embodiments, the characteristics are variable characteristics associated with a torque applied to one or more joints of the motion assistive apparatus by an actuator.

In some example embodiments, the variable characteristics include at least one of a magnitude of the assist power, a response speed of the motion assistive apparatus, and motion smoothness of the motion assistive apparatus.

In some example embodiments, the torque applied to the joints has a rise time, an overshoot and a settling time associated therewith, and the processor is configured to, adjust the overshoot associated with the torque, in response to the input requesting an adjustment in the magnitude of the assist power, adjust the rise time associated with the torque, in response to the input requesting an adjustment of the response speed, and adjust the settling time associated with the torque, in response to the input requesting an adjustment of the motion smoothless.

In some example embodiments, the motion assistive apparatus includes a memory configured to store rules therein indicating a relationship between the variable characteristics and overshoot, rise time and settling time associated with the torque.

In some example embodiments, the torque applied to the joints is a function of at least a variation in mass according to a pose of the user, a Coriolis force applied to the joints according to rotation of legs of the user, and a gravitational force, and the processor is configured to adjust, based on the input, one or more of the variation in mass, the Coriolis Force and the gravitational force.

In some example embodiments, the motion assistive apparatus includes a receiver configured to receive the input from the user.

In some example embodiments, the motion assistive apparatus includes a walking assistive device having an exoskeleton shape such that the walking assistance device is configured to be worn on one or more legs of the user, the walking assistive device including an actuator configured to provide an assist power to joints of the assistive device based on a control signal generated by the processor.

BRIEF DESCRIPTION OF THE DRAWINGS

These and/or other aspects of the example embodiments will become apparent and more readily appreciated from the following description of some of the example embodiments, taken in conjunction with the accompanying drawings of which.

DETAILED DESCRIPTION

Figure 1:
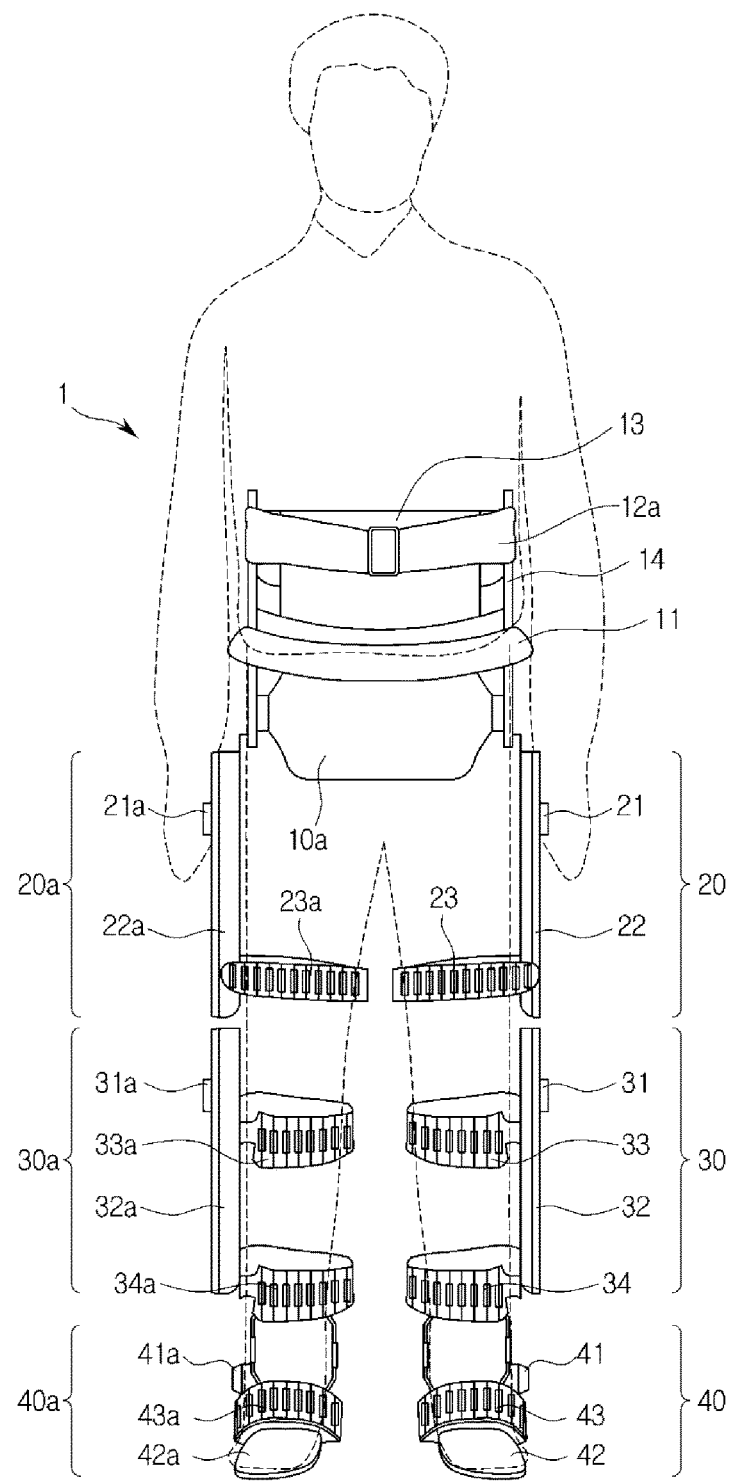
FIG. 1 is a front view illustrating an motion assistive apparatus according to some example embodiments.

Reference will now be made in detail to the example embodiments, some examples of which are illustrated in the accompanying drawings, wherein like reference numerals refer to like elements throughout.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 2:
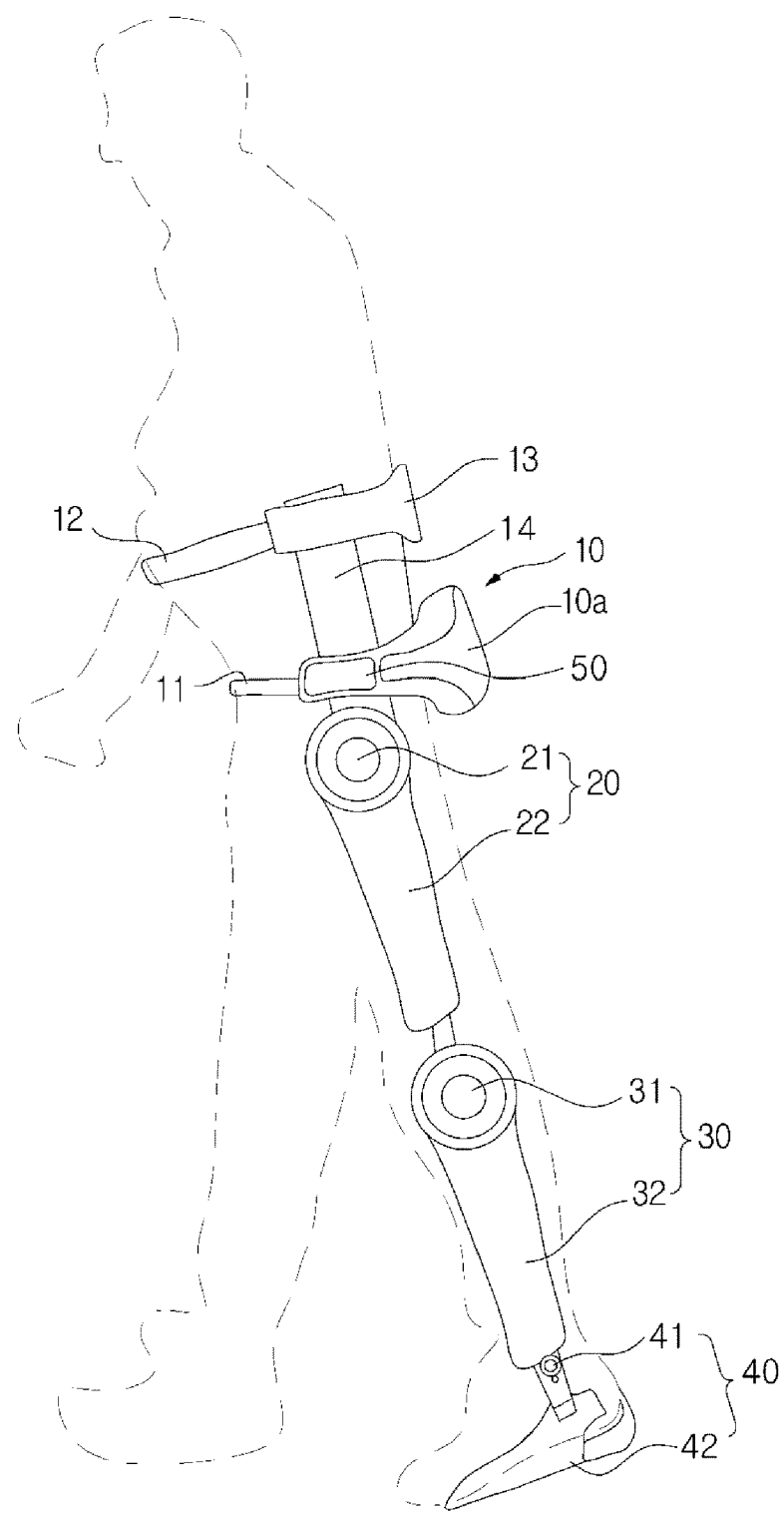
FIG. 2 is a side view illustrating an motion assistive apparatus according to some example embodiments.
Figure 3:
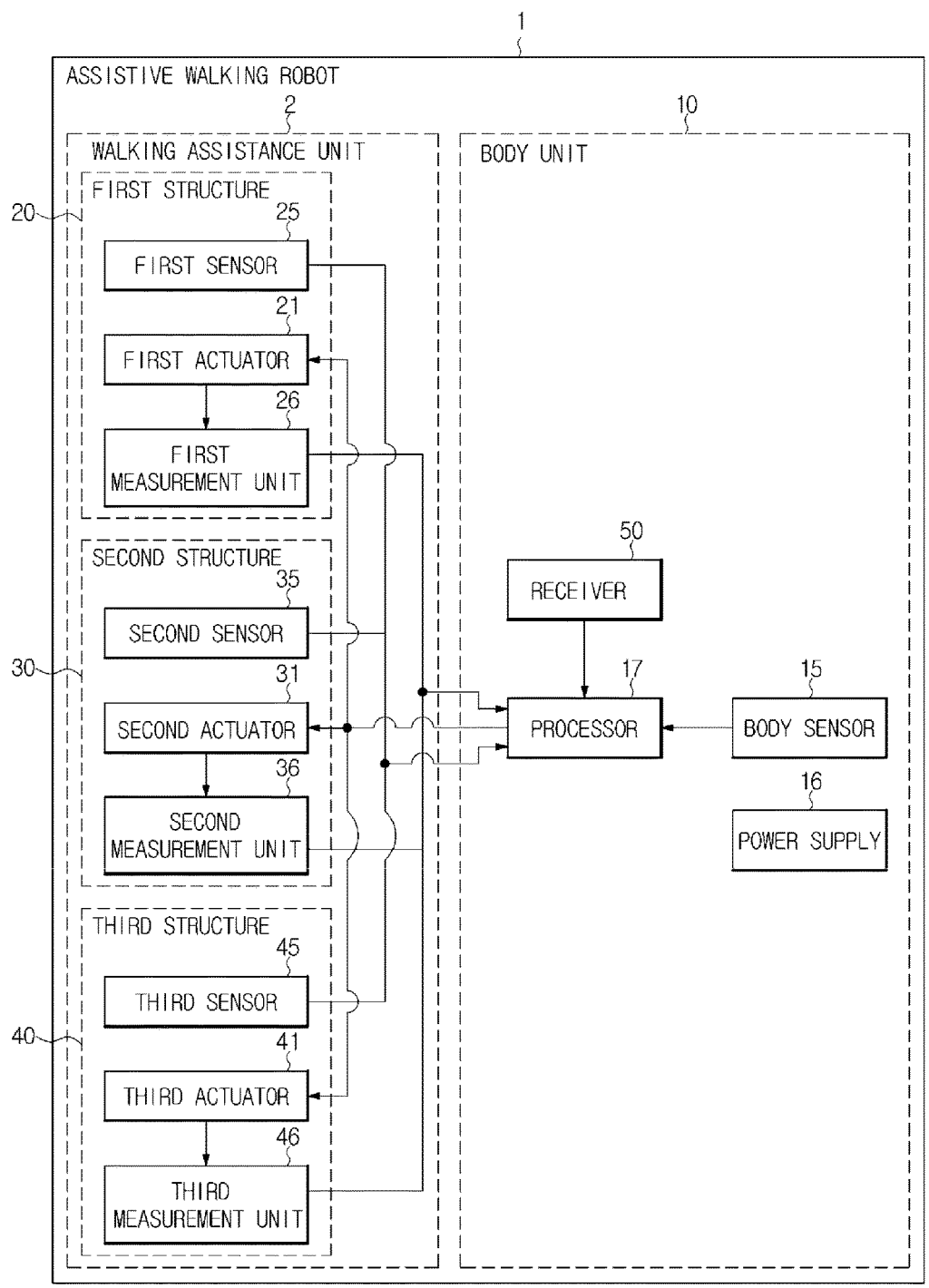
FIG. 3 is a block diagram illustrating an motion assistive apparatus according to some example embodiments.
Figure 4:
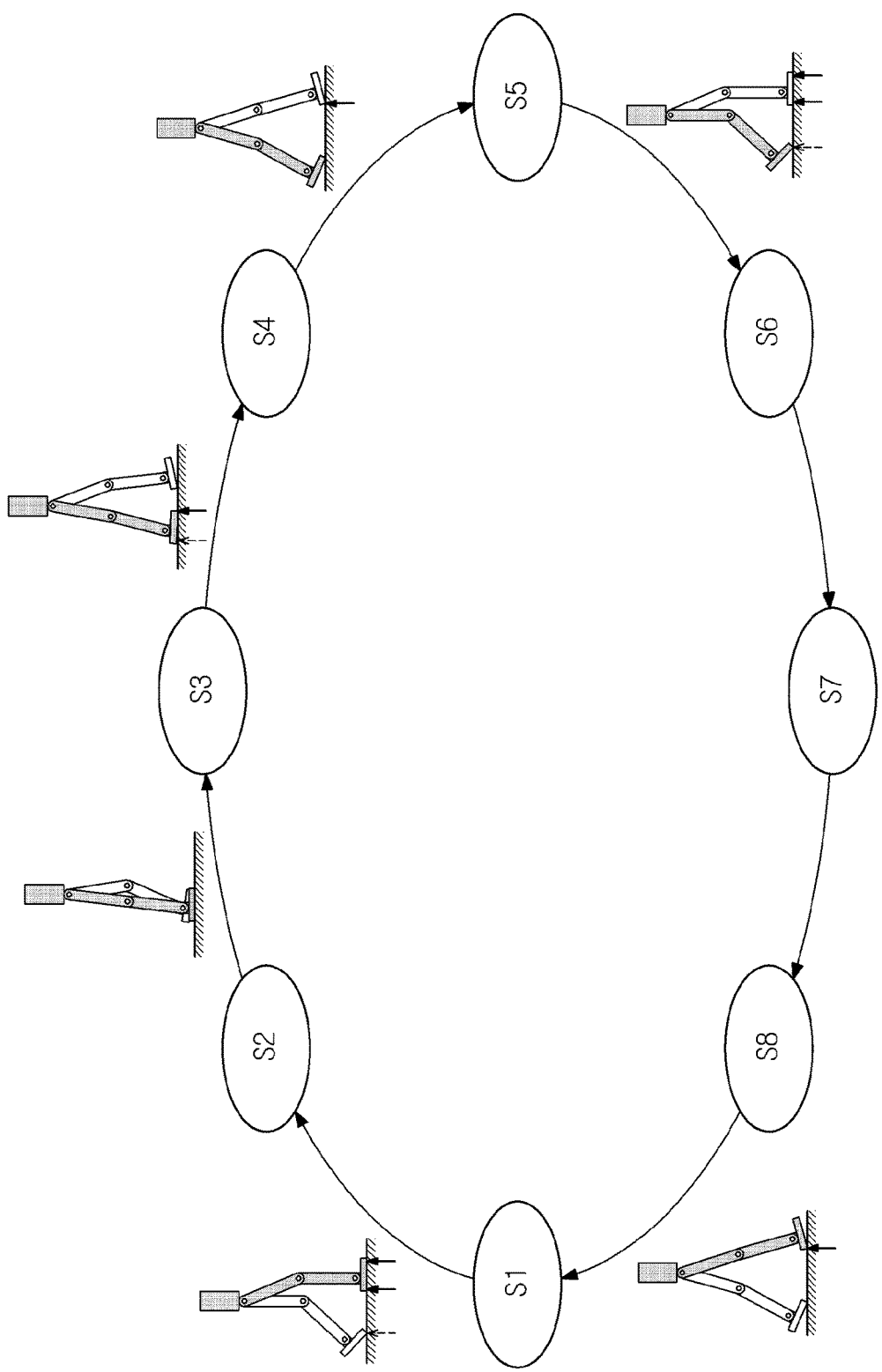
FIGS. 4 and 5 are views illustrating a walk model according to some example embodiments.
Figure 5:
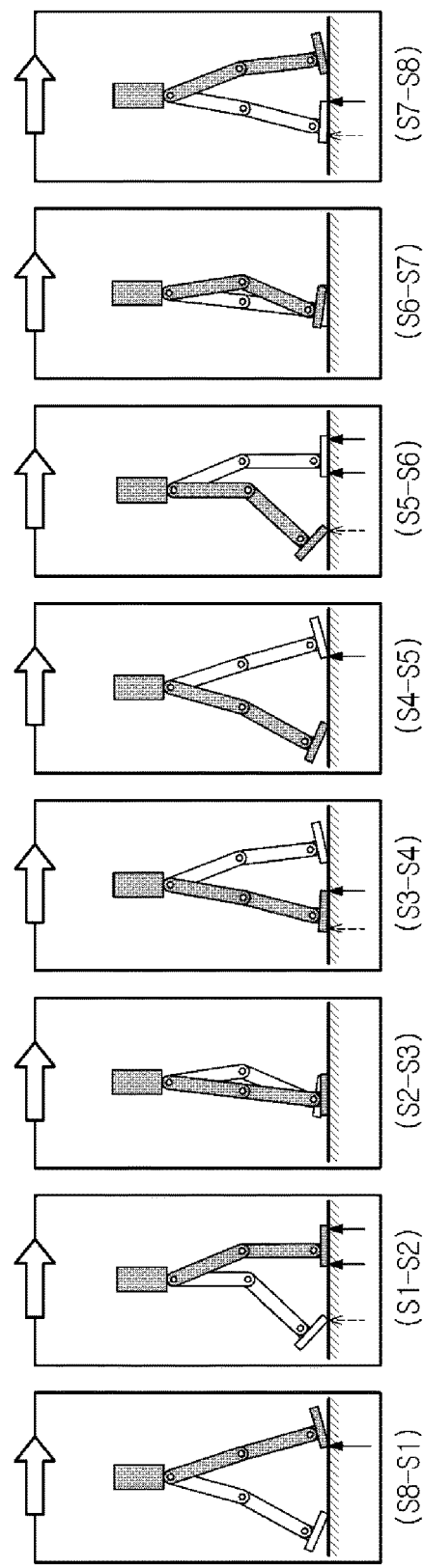

FIG. 1 is a front view illustrating an motion assistive apparatus according to some example embodiments, and FIG. 2 is a side view illustrating an motion assistive apparatus according to some example embodiments. FIG. 3 is a block diagram illustrating an motion assistive apparatus according to some example embodiments, and FIGS. 4 and 5 are views illustrating a walk model according to some example embodiments.

As shown in FIGS. 1 to 3, an motion assistive apparatus 1 may include a walking assistance unit 2 and a body unit 10 to control the walking assistance unit 2.

The walking assistive unit 2 may be fixed to a leg or foot of a user to assist the user in walking. The walking assistance unit 2 may include at least one or more of a first structure 20, a second structure 30 and a third structure 40. Hereinafter, a detailed description will be given of the case in which the motion assistive apparatus 1 includes the first structure 20, the second structure 30 and the third structure 40, however, example embodiments are not limited thereto.

According to some example embodiments, the walking assistance unit 2 may include the first structure 20, the second structure 30 and the third structure 40. At least one of the first structure 20, the second structure 30 and the third structure 40 may be installed at one of the left and right legs of the user. According to other example embodiments, the walking assistance unit 2 may include a pair of first structures 20 and 20*a*, a pair of second structures 30 and 30*a*, and a pair of third structures 40 and 40*a*, such that the walking assistance unit 2 is installed at both the left and right legs of the user, as shown in FIG. 1. The structures in a same pair may perform substantially the same function and operation. According to other example embodiments, some of the structures 20 to 40 may be provided to the walking assistance unit 2 as single elements, and the others may be provided in pairs. For example, the walking assistance unit 2 may include first structures 20 and 20*a*, one second structure 30 and one third structure 40.

Hereinafter, a description will be given of the first to third structures 20 to 40. The description is also applicable to the other half of each pair of the structures.

The first structure 20 may assist movement of the femoral region and hip joint of the user when the user walks. The first structure 20 may include at least one first actuator 21 and at least one first supporter 22.

As discussed in more detail below with regard to FIG. 3, the first actuator 21 may generate torque according to a control command transferred from a processor 17 of the body unit 10 and apply the same to the first supporter 22. When the torque is applied to the first supporter 22, the first actuator 21 may rotate in at least one direction. The range of rotation of the first actuator 21 may be within the movement range of the hip joint of the user.

According to some example embodiments, the first actuator 21 may include a motor that generates torque according to electric energy supplied from a power supply 16 of the body unit 10. The motor may be provided with an encoder. According to other example embodiments, the first actuator 21 may include at least one piston or cylinder device that is operated by electric energy supplied from the body unit 10 or by fluidic pressure such as, for example, hydraulic pressure or pneumatic pressure generating torque. In some example embodiments, the first actuator 21 may include both at least one motor and at least one piston or cylinder device.

The at least one first supporter 22 may be connected to the first actuator 21, thereby rotating in at least one direction according to torque generated by the first actuator 21. The first supporter 22 may take various forms. For example, the first supporter 22 may include at least one support panel. In addition, the first supporter 22 may include a plurality of segments and a link connecting the segments. Herein, the segments may be supporters or support panels.

At least one first fixing part 23 may be installed at the first supporter 22. The first supporter 22 may be fixed to the exterior or interior of the user's femoral region through the first fixing part 23.

The first supporter 22 may apply the torque generated by the first actuator 21 to the user's femoral region through the first fixing part 23. For example, when the first supporter 22 rotates according operation of the first actuator 21, the user's femoral region fixed to the first supporter 22 by the first fixing part 23 may rotate in the same direction as the first supporter 22. In other words, the first structure 20 may apply torque to the user's femoral region or hip joint to assist the user in raising or lowering the femoral region. Thereby, walking or raising a leg may be assisted by assist power provided by the motion assistive apparatus 1.

The first fixing part 23 may be formed of a metallic material or an elastic material such as rubber, however, example embodiments are not limited thereto. The first fixing part 23 may take the form of a chain as shown in FIG. 1, or may be implemented as a band having elasticity or a strap, however, example embodiments are not limited thereto. Examples of the first fixing part 23 may include various fixing members that those skilled in the art may employ to fix the first supporter 22 to the femoral region.

The first structure 20 may include at least one first sensor 25 as shown in FIG. 3. The first sensor 25 may sense at least one of operations of the first actuator 21, the first supporter 22 and the user's hip joint. The first sensor 25 may generate an electrical signal corresponding to a sensed operation. The sensor 25 may sense information related to walking. The information related to walking may include at least one of joint angle, tilt of the first supporter 22, joint angular acceleration and joint acceleration. The information acquired through the first sensor 25 may be transferred to the processor 17 as shown in FIG. 3.

The first sensor 25 may include, for example, at least one of a joint angle sensor, a tilt sensor, an acceleration sensor and an inertial measurement unit (IMU). The first sensor 25 may be associated with at least one of the first actuator 21 and the first supporter 22. In some example embodiments, both the first actuator 21 and the first supporter 22 may be provided with the first sensor 25. In addition, a part of the first sensor 25 may be installed at the first actuator 21 and the other part of the first sensor 25 may be installed at the first supporter 22. For example, the joint angle sensor may be installed at the first actuator 21, and the tilt sensor or the IMU may be installed at the first supporter 22.

According to some example embodiments, the first structure 20 may also include at least one first measurement unit 26 as shown in FIG. 3. The first measurement unit 26 may be connected to the first actuator 21 to acquire information related to operation of the first actuator 21. The information related to operation of the first actuator 21 may include at least one of the rotation angle, angular velocity and angular acceleration of the first actuator 21. In the case that the first actuator 21 is a motor with an encoder, the first measurement unit 26 may measure the angle, speed, and acceleration of a joint using a value from the encoder. The first measurement unit 26 may transfer the measured parameters to the processor 17 as shown in FIG. 3.

The second structure 30 may assist movement of the user's lower leg and knee joint when the user walks. The second structure 30 may include a second actuator 31, a second supporter 32 and a second fixing part 33, as shown in FIGS. 1 to 3.

The second actuator 31 may generate torque in the same manner as in the first actuator 21. In addition, the second actuator 31 may include a motor and at least one of a piston and a cylinder device, and the motor may include an encoder.

The second supporter 32 may rotate according to the torque generated by the second actuator 31. The configuration, structure and material of the second supporters 32 and 32a may be the same as those of the first supporters 22 and 22a, therefore, for the sake of brevity a repeated description will be omitted.

The second structure 30 may include at least one second fixing part 33, 34 to fix the second supporter 32 to the user's lower leg. The second supporter 32 may be fixed to the exterior or interior of the user's lower leg by the second fixing part 33, 34. The configuration, structure and material of the second fixing part 33, 34 may be the same as those of the first fixing part 23, however, as illustrated in FIG. 1, the second fixing part 33, 34 include an upper second fixing part 33 and a lower second fixing part 34.

The second supporter 32 may apply the torque generated by the second actuator 31 to the user's lower leg or knee joint through the second fixing part 33, 34. For example, when the second supporter 32 rotates according to operation of the second actuator 31, the user's lower leg or knee joint fixed to the second supporter 32 by the second fixing part 33, 34 may rotate in the same direction as the direction of rotation of the second supporter 32. In other words, the second structure 30 may apply torque to the user's lower leg or knee joint to assist the user in raising or lowering the lower leg. Thereby, walking or raising of the user's leg may be assisted by assist power provided by the motion assistive apparatus 1.

As shown in FIG. 3, the second structure 30 may include at least one second sensor 35. The second sensor 35 may sense at least one of operations of the second actuator 31, the second fixing part 33 and the user's knee joint, convert the same into an electrical signal, and transfer, as shown in FIG. 3, the electrical signal to the processor 17. The second sensor 35 may include at least one of a joint angle sensor, a tilt sensor, an acceleration sensor and an IMU. The second sensor 35 may be associated with at least one of the second actuator 31 and the second supporter 32. Similar to the first sensor 25, a part of the second sensor 35 may be installed at the second actuator 31 and the other part of the second sensor 35 may be installed at the second supporter 32.

According to some example embodiments, the second structure 30 may also include at least one second measurement unit 36. The second measurement unit 36 may acquire information related to operation of the second actuator 31. The information related to operation of the second actuator 31 may include at least one of the rotation angle, angular velocity and angular acceleration of the second actuator 31. In the case that the second actuator 31 is a motor with an encoder, the second measurement unit 36 may use a value from the encoder to measure the angle, speed and acceleration of a joint. The parameters measured by the second measurement unit 36 may be transferred to the processor 17.

The third structure 40 may assist motion of the user's ankle when the user walks. As shown in FIG. 1, the third structure 40 may include a third actuator 41, a foot support 42, and a third fixing part 43.

Similar to the first actuator 21, the third actuator 41 may generate torque to assist the user's movement associated with the ankle joint and muscles around the ankle joint. Similar to the first actuator 21 and the second actuator 31, the third actuator 41 may include a motor and at least one of a piston and a cylinder device, and the motor may include an encoder.

The foot support 42 may support the sole of the user's feet.

The third fixing part 43 may fix the user's foot seated on the foot support 42 to the foot support 42. The configuration, structure and material of the third fixing part 43 may be the same as those of the first fixing part 23 or the second fixing part 33.

As shown in FIG. 3, the third structure 40 may include a third sensor 45. The third sensor 45 may sense at least one of operations of the third actuator 41, the third fixing part 43 and the user's ankle joint. The third sensor 45 may include at least one of a joint angle sensor, a tilt sensor, an acceleration sensor and an IMU. The third sensor 45 may include a pressure sensor. The pressure sensor may be installed at the foot support 42. The pressure sensor may sense the user's weight, thereby sensing whether the user wears the motion assistive apparatus 1 or whether the user is standing. In addition, the pressure sensor may be a ground reaction force (GRF) sensor that senses GRF transferred to the user's foot when the user walks. A signal generated according to sensing by the third sensor 45 may be transferred to the processor 17, as shown in FIG. 3.

In addition, as shown in FIG. 3, the third structure 40 may include at least one third measurement unit 46. The third measurement unit 46 may measure information related to operation of the third actuator 41 and transfer the measured information to the processor 17. In the case that the third actuator 41 is a motor with an encoder, the third measurement unit 46 may use a value from the encoder to measure the angle, speed and acceleration of a joint.

The body unit 10 may control operation of the walking assistance unit 2 and/or acquire information related to walking. In addition, the body unit 10 may support the user's upper body to assist the user in stably wearing the motion assistive apparatus 1.

As shown in FIGS. 1 and 2, the body unit 10 may include a housing 10a in which various components for control of the motion assistive apparatus 1 may be installed, and a receiver 50 through which a command related to operation of the motion assistive apparatus 1 may be input. The housing 10a may be equipped with a printed circuit board, on which the body sensor 15, the power supply 16, the processor 17 or various semiconductor chips may be installed. The housing 10a of the body unit 10 may safely protect the components installed in the housing 10a and stably fix the components.

The body unit 10 may further include a first waist fixing part 11 and a second waist fixing part 12. The first waist fixing part 11 and the second waist fixing part 12 may fix the housing 10a to the user's waist. The first waist fixing part 11 may be connected, for example, to the housing 10a, and the second waist fixing part 12 may be connected to the first waist supporter 13. The first waist fixing part 11 and the second waist fixing part 12 may be formed of a metallic material or an elastic material such as rubber, however, example embodiments are not limited thereto. The first waist fixing part 11 and the second waist fixing part 12 may be chains, bands with elasticity, or various kinds of straps, however, example embodiments are not limited thereto. The first waist fixing part 11 and the second waist fixing part 12 may include various fixing means that those skilled in the art may employ to fix the housing 10a to the waist or hip. The body unit 10 may further include a first waist supporter 13 to support the user's waist. The first waist supporter 13 may be designed in a shape corresponding to the shape of the user's waist so as to support the user's waist. The first waist supporter 13 may be connected to the housing 10a through the second waist supporter 14, as shown in FIG. 1.

As shown in FIG. 3, the body unit 10 may include a body sensor 15, a power supply 16, a processor 17, and a receiver 50.

The body sensor 15 may sense the user's movement to acquire various kinds of information related to the user's movement. For example, the body sensor 15 may sense the walking speed of the user. The body sensor 15 may include at least one of a speed sensor, a tilt sensor, an acceleration sensor, an IMU, and a position measurement sensor, e.g., a global positioning system (GPS).

The power supply 16 may supply power to various components in the housing 10a or components of the walking assistance unit 2 such as actuators 21, 31 and 41. The power supply 16 may be installed in the housing 10a. The power supply 16 may be a primary battery or a secondary battery. The primary battery may include at least one of a mercury cell, a manganese battery, an alkaline cell and a lithium battery. The secondary battery may include a nickel-cadmium battery, a nickel-hydride battery, a lead-acid battery, a lithium-ion battery, and a lithium polymer battery.

The processor 17 may determine an operational state of each of the hip joint, knee joint, ankle joint and actuators 21, 31 and 41 corresponding to the aforementioned joints based on information transferred from the first to third sensors 25, 35 and 45 and the first to third measurement units 26, 36 and 46. In addition, the processor 17 may generate a control signal for control of the motion assistive apparatus 1 based on the determination about the operational states of the joints and the actuators 21, 31 and 41 corresponding to the joints.

The body unit 10 may include the processor 17 and a memory (not shown).

The processor 17 may be a processing unit provided with at least one silicon chip on which an arithmetic and logic unit, a register, a program counter, a command decoder, and/or a control circuit are installed. The processor 17 may be implemented by at least one semiconductor chip disposed on a printed circuit board installed in the housing 10a.

Figure 11:
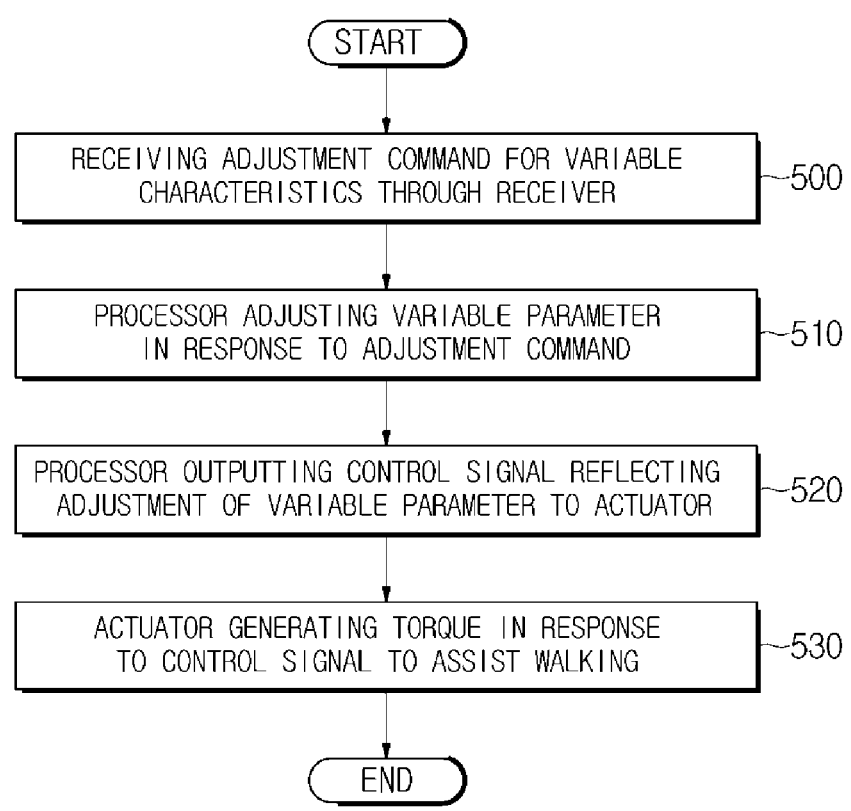
FIG. 11 is a flowchart illustrating a method of controlling an motion assistive apparatus according to some example embodiments.

The processor 17 may be an arithmetic logic unit, a digital signal processor, a microcomputer, a field programmable array, a programmable logic unit, a microprocessor or any other device capable of responding to and executing instructions in a defined manner such that the processor 17 is programmed with instructions that configure the processor as a special purpose computer to perform the operations illustrated in FIG. 11, such that the processor 17 is configured to adjust variable parameters to change variable characteristics associated with the motion assistive apparatus 1 in response to an adjustment command input through the receiver 50.

The variable parameters adjusted by the processor 17 may include parameters affecting mass, Coriolis force and gravitational force applied by the motion assistive apparatus 1 and the variable characteristics changed by varying the aforementioned parameters may include at least one of a magnitude of assist power, a response speed, and motion smoothness of the motion assistive apparatus 1.

Therefore, the motion assistive apparatus 1 may allow the user to adjust the performance of the motion assistive apparatus 1 by adjusting the variable parameters through the receiver 50 without performing a calibration operation to adjust fixed parameters associated with the motion assistive apparatus 1.

The processor 17 may estimate motions of the joints by calculating an inverse dynamic model of the user and the motion assistive apparatus 1 based on information related to motions transferred from the measurement units 26, 36 and 46.

According to one embodiment, the processor 17 may estimate motions of joints based on a desired (or, alternatively, a predetermined) walking model.

The memory may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

FIGS. 4 and 5 are views illustrating a finite state machine model, which is an example of a walking model according to some example embodiments.

Referring to FIG. 4, walking may be divided into eight phases s1 to s8.

In a first walking phase s1, the right leg may be in the loading response (LR) state, and the left leg may be in the pre-swing (PSw) state. When transition from the eighth walking phase s8 to the first walking phase s1 occurs, the heel of the right foot may contact the ground as shown in FIGS. 4 and 5. On the other hand, the toes of the left foot may contact the ground and the heel of the left foot may be spaced from the ground (s8-s1).

In the second walking phase s2, the right leg may be in the mid-stance (MSt) state, and the left leg may be in the initial swing (ISW) state. During transition from the first walking phase s1 to the second phase s2, the toes and heel of the right foot may contact the ground at the same time, and the left leg may begin to swing. The heel of the left leg may leave the ground first, and the toes of the left foot may leave the ground after the heel leaves the ground (s1-s2).

In the third walking phase s3, the right leg may still be in the MSt state, while the left leg may be in the mid swing (MSw) state. During transition from the second walking phase s2 to the third walking phase s3, all the toes and heel of the right foot may contact the ground, and the left leg may keep swinging. The right foot and the left foot may be positioned near each other (s2-s3).

In the fourth walking phase s4, the right leg may be in the terminal stance (TSt) state, and the left leg may be in the terminal swing (TSw) state. When transition from the third walking phase s3 to the fourth walking phase s4 occurs, the heel of the right foot may begin to leave the ground. On the other hand, the toes of the right foot may still be in contact with the ground. Meanwhile, the left foot may remain spaced from the ground (s3-s4).

In contrast with the first walking phase s1, in the fifth walking phase s5, the left leg may be in the LR state and the right leg may be in the PSw state. When transition from the fourth walking phase s4 to the fifth walking phase s5 occurs, the heel of the left foot may contact the ground. Meanwhile, the toes of the right foot may be in contact with the ground, and the heel of the right foot may be spaced from the ground (s4-s5).

In the sixth walking phase s6, the left leg may be in the MSt state, and the right leg may be in the ISw state. When transition from the fifth walking phase s5 to the sixth walking phase s6 occurs, the toes and heel of the left foot may contact the ground at the same time. The right leg may begin to swing as the toes of the right foot leaves the ground (s5-s6).

In the seventh walking phase s7, the left leg may still be in the MSt state, and the right leg may be in the MSw state. When transition from the sixth walking phase s6 to the seventh walking phase s7, both the toes and heel of the left foot may contact the ground, and the right leg may keep performing swinging movement (s6-s7).

In the eighth walking phase s8, the left leg may be in the TSt state, and the right leg may be in the TSw state. When transition from the seventh walking phase s7 to the eighth walking phase s8 occurs, the right foot may still remain spaced from the ground, and the heel of the left foot may begin to leave the ground (s7-s8).

The first to eighth phase s1 to s8 may be repeated while walking is conducted.

When walking phase transitions (s8-s1 to s7-s8) occurs during walking, the at least one measurement unit 26, 36, 46 may measure and collect information related to motion of at least one joint. The at least one measurement unit 26, 36, 46 may measure information related to motion of a joint at a certain time point during the transition processes (s8-s1 to s7-s8). According to some example embodiments, the at least one measurement unit 26, 36, 46 may measure information related to motion of a joint at a plurality of time points during a transition process, thereby acquiring an average or median value of the plural pieces of information.

For example, at least one measurement unit 26, 36, 46 may collect information related to motion of at least one of the user's joints corresponding to the at least one measurement unit 26, 36, 46. In addition, the at least one measurement unit 26, 36, 46 may collect information related to operation of at least one of the first to third actuators 21, 31 and 41 corresponding to the at least one measurement unit 26, 36, 46 to collect information related to motion of at least one joint. In this case, the information collected by the measurement unit 26, 36, 46 may include joint angle, joint angular velocity, joint angular acceleration, walking speed of the motion assistive apparatus 1 and the GRF. The information measured by the at least one measurement unit 26, 36, 46 may be transferred to the processor 17, or may be temporarily or nontemporarily stored in a storage unit, for example, the memory (not-shown) and then transferred to the processor 17.

According to some example embodiments, the at least one measurement unit 26, 36, 46 may measure and collect information related to motion of at least one joint during all the transition processes. According to other example embodiments, at least one measurement unit 26, 36, 46 may collect information related to motion of at least one joint during a part of the transition processes. For example, the at least one measurement unit 26, 36, 46 may measure and collect information related to motion of at least one joint only during the transition processes from a first transition process (s8-s1) to a fourth transition process (s3-s4).

According to some example embodiments, when the at least one measurement unit 26, 36, 46 measures and collects information related to motion of at least one joint, time information about a measuring time point in addition to the other information may be transferred to the processor 17.

The processor 17 may compute and estimate motion of at least one joint using the time information about the time points at which measurement is conducted by the measurement unit 26, 36, 46 and the information measured by the measurement unit 26, 36, 46. In this case, the estimated motion of the joint may be used to determine a motion state of the at least one joint in a subsequent walking phase. For example, motion of the joint estimated during the first to fourth transition process (s8-s1 to s3-s4) may be used to determine motion states of the at least one joint in the fifth to eighth walking phases s5 to s8.

The processor 17 may estimate information related to the motion of a joint at a time point between plural time points at which the information is measured, using an interpolation technique. In this case, the estimated information related to the motion of the joint may include joint angle, joint angular velocity, and joint angular acceleration.

The processor 17 may compute torque of at least one joint based on at least one value measured by at least one of the first to third measurement units 26, 36 and 46. In this case, various parameters for the at least one joint measured by the first to third measurement units 26, 36 and 46, for example, joint angle, joint angular velocity, and joint acceleration may be used to compute torque of the at least one joint.

The motion assistive apparatus 1 may provide a method for a user to intuitively adjust variable characteristics associated with performance of the motion assistive apparatus 1 such that the variable characteristics are suitable for the user's body type and walking habit.

The variable characteristics may be characteristics associated with performance of the motion assistive apparatus that the user may adjust to conveniently and naturally use the motion assistive apparatus according to the user's body type and walking habit. For example, the variable characteristics may include the magnitude of assist power provided by the motion assistive apparatus, the response speed of the motion assistive apparatus, and the motion smoothness of the motion assistive apparatus.

When the motion assistive apparatus 1 needs to produce a larger or smaller force to assist the user in walking, the magnitude of assist power may need to be adjusted. When the assist power needs to be quickly provided in response to the user's motion, the response speed of the motion assistive apparatus may need to be adjusted. In addition, when more comfortable and natural walking is desired, the motion smoothness of the motion assistive apparatus may need to be adjusted.

The variable characteristics are not limited to the aforementioned examples. For example, in some example embodiments, the variable characteristics may include any characteristics associated with performance of the motion assistive apparatus that may need to be adjusted, for example, to provide a more comfortable and natural walking.

The receiver 50 may provide a user interface to allow the user to intuitively adjust the variable characteristics.

Figure 6:
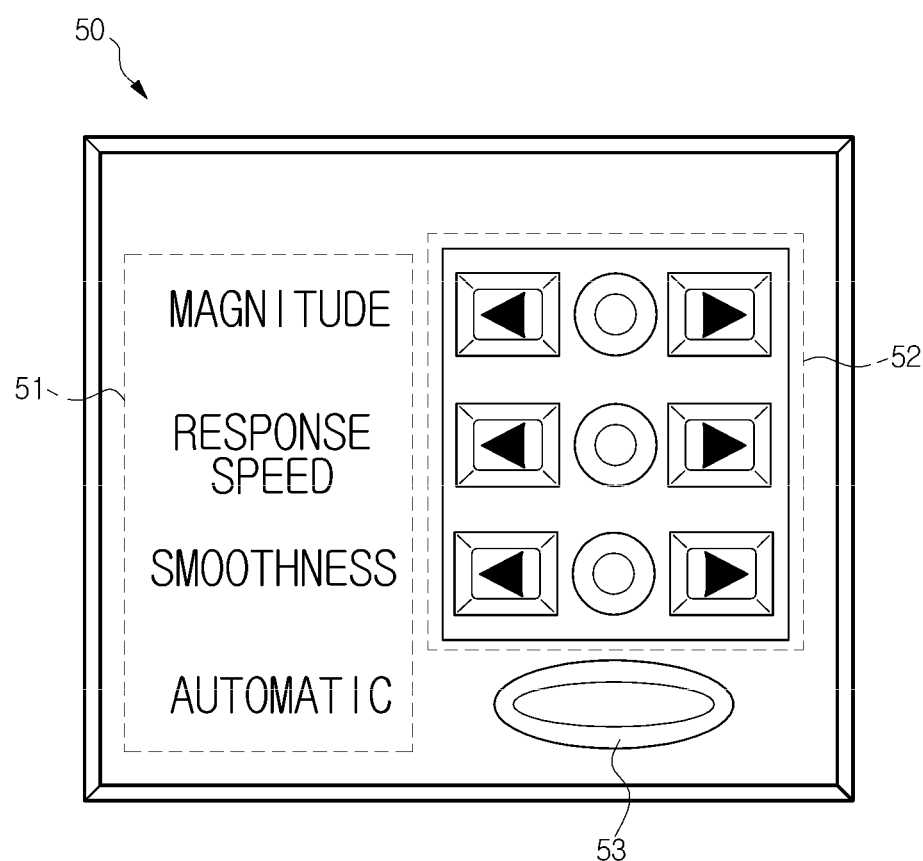
FIGS. 6 and 7 are conceptual views illustrating a user interface provided to a receiver of an motion assistive apparatus to adjust variable characteristics according to various example embodiments.
Figure 7:
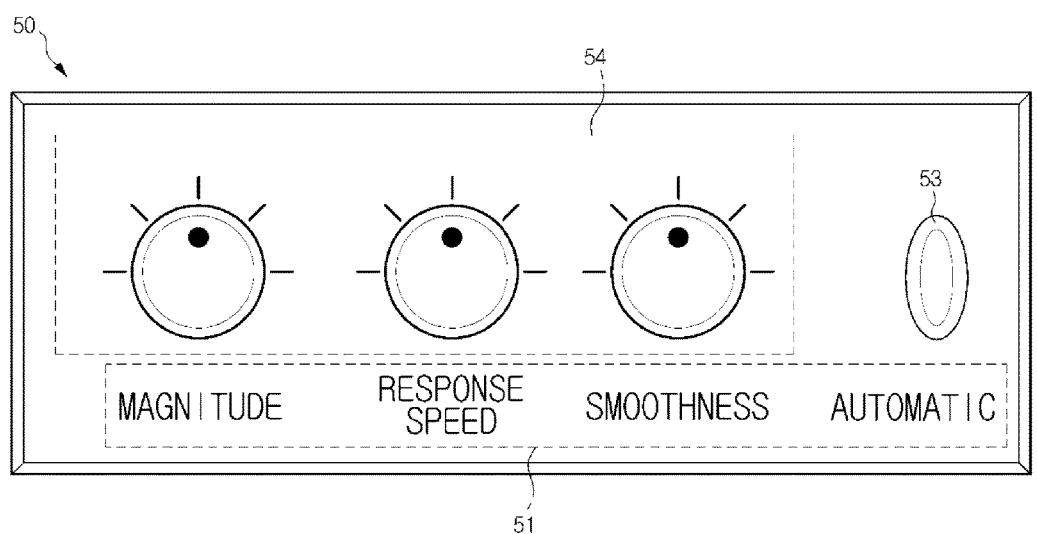

FIGS. 6 and 7 are views illustrating examples of a user interface provided to a receiver of the motion assistive apparatus to adjust variable characteristics according to various example embodiments.

As shown in FIGS. 6 and 7, names 51 of representative properties of the variable characteristics to be adjusted may be displayed on the receiver 50. For example, the magnitude of the assist power may be indicated by "MAGNITUDE," the response speed of the motion assistive apparatus may be indicated by "RESPONSE SPEED," and the motion smoothness of the motion assistive apparatus may be indicated by "SMOOTHNESS."

In addition, as illustrated in FIG. 6, the receiver 50 may include at least one adjustment button 52 provided for each variable characteristics to increase or decrease the level of each of the variable characteristics. Further, as illustrated in FIG. 7, the receiver 50 may include one adjustment dial 54 provided for each variable characteristics to increase or decrease the level of each of the variable characteristics.

The user may manipulate the adjustment button 52 of FIG. 6 or the adjustment dial 54 of FIG. 7 to adjust the current level of a desired one of the variable characteristics to a higher or lower level. However, the button and the dial are examples, and the receiver 50 may be implemented in various other forms. For example, the user interface 50 may also be constructed through a structure such as a joystick or a track ball.

In addition, the receiver 50 may include an Automatic button 53 as shown in FIGS. 6 and 7. When the Automatic button 53 is pushed by the user, each of the variable characteristics may be automatically adjusted according to desired (or, alternatively, predetermined) settings. For example, the user may pre-store settings proper for the user's body type and walking habit, and may adjust the performance of the motion assistive apparatus according to the desired settings by manipulating the Automatic button 53, without frequently adjusting the variable characteristics.

The receiver 50 may be provided with a separate button or dial for such settings. Alternatively, without employing a separate button or dial, settings may be established and stored by manipulating the buttons provided to adjust the variable characteristics according to desired (or, alternatively, predetermined) rules.

The user interfaces shown in FIGS. 6 and 7 are simply illustrative. The user interface may employ a touchscreen to adjust the variable characteristics through touch. Alternatively, the user interface may be implemented with a voice recognition device such that the variable characteristics are adjusted according to user voice commands. In addition, the user interface may employ a motion recognition device to adjust the variable characteristics by recognizing the user's motion.

The receiver 50 may be implemented through various combinations of the examples given above for the user interface, and the user may select a user interface corresponding to a desired command input type and input a command.

The receiver 50 may be installed at any portion of the motion assistive apparatus. For example, the receiver 50 may be installed at the body unit 10 such that the receiver 50 is reachable by the user, as shown in FIG. 2.

When the user inputs a command to adjust a desired one of the variable characteristics through the receiver 50, the processor 17 may be configured to adjust parameters corresponding to the desired variable characteristics to adjust the variable characteristics.

The motion assistive apparatus 1 may be modeled as Equations 1-4.

$$V = Li + Ri + K(dq/dt) \quad \text{Equation 1}$$

$$\tau_m = J(d^2q/dt^2) + B(dq/dt) + \tau_l \quad \text{Equation 2}$$

$$\tau_l = M(d^2q/dt^2) + C(dq/dt) + Gq \quad \text{Equation 3}$$

$$\tau_l = f(L, R, K, J, B, M, C, G)_l \quad \text{Equation 4}$$

Equations 1-4 are a model of production of torque $\tau_l$ that rotates a load, i.e., a joint when a voltage V is applied to an actuator of the motion assistive apparatus, e.g., a motor.

In Equation 1, V denotes an input voltage applied to the motor, L denotes inductance of the motor, R denotes resistance, and. K denotes counter-electromotive force. In addition, I denotes current, and q denotes a rotation angle of a joint. In Equation 2, $\tau_m$ denotes output torque of the motor, J denotes an inertia moment of the motor, B denotes a viscous friction coefficient, and $\tau_l$ denotes torque applied to a load. In addition, dq/dt denotes an angular velocity of a joint, and $d^2q/dt^2$ denotes an angular acceleration of the joint.

In Equation 3, $\tau_l$ denotes torque of the joint. M is a first parameter reflecting variation in mass according to the user's pose, C is a parameter reflecting Coriolis force according to rotation of the legs, and G is a parameter reflecting gravitational force of the Earth. Parameters M, C and G are not constant but are adjustable, unlike the other system parameters.

The magnitude of the Coriolis acceleration of an object may be proportional to the velocity of the object and also to the sine of the angle between the direction of movement of the object and the axis of rotation, and the Coriolis force may be obtained by multiplying the Coriolis acceleration by the mass of the object.

The load torque $\tau_l$ produced by an actuator and applied to a joint is a function of parameters L, R, K, J, B, M, C, and G as shown in Equation 4. Parameters L, R, K, J and B are unique variables of constituents such as a motor of the actuator, a speed reducer and a link. These parameters are fixed parameters set through calibration during fabrication of the motion assistive apparatus 1.

To adjust performance of the motion assistive apparatus 1 to a level proper for the user's body type or walking habit by adjusting these fixed parameters, calibration may need to be conducted every time the motion assistive apparatus 1 is put on or an average value may need to be set. Conventionally, such calibrating operations may cause inconvenience in using the motion assistive apparatus 1 and degrade usability of the motion assistive apparatus 1.

In contrast, in some example embodiments, the motion assistive apparatus 1 may allow the user to intuitively adjust the performance of the motion assistive apparatus to a level proper for the user's body type or walking habit without separately performing a calibration operation to adjust the fixed parameters, but rather by adjusting variable parameters such as M, C and G in response to a command to adjust variable characteristics input through the receiver 50.

Once a command to adjust the variable characteristics is input through the receiver 50, the processor 17 may be configured to determine variable parameters related to adjustment of the variable characteristics among the aforementioned variable parameters and adjusts the determined variable parameters to change the variable characteristics in response to the adjustment command input through the receiver 50.

In adjusting the time response characteristics of the load torque in response to adjustment of the variable characteristics, the processor 17 adjusts variable parameters constituting the time response characteristics.

Figure 8:
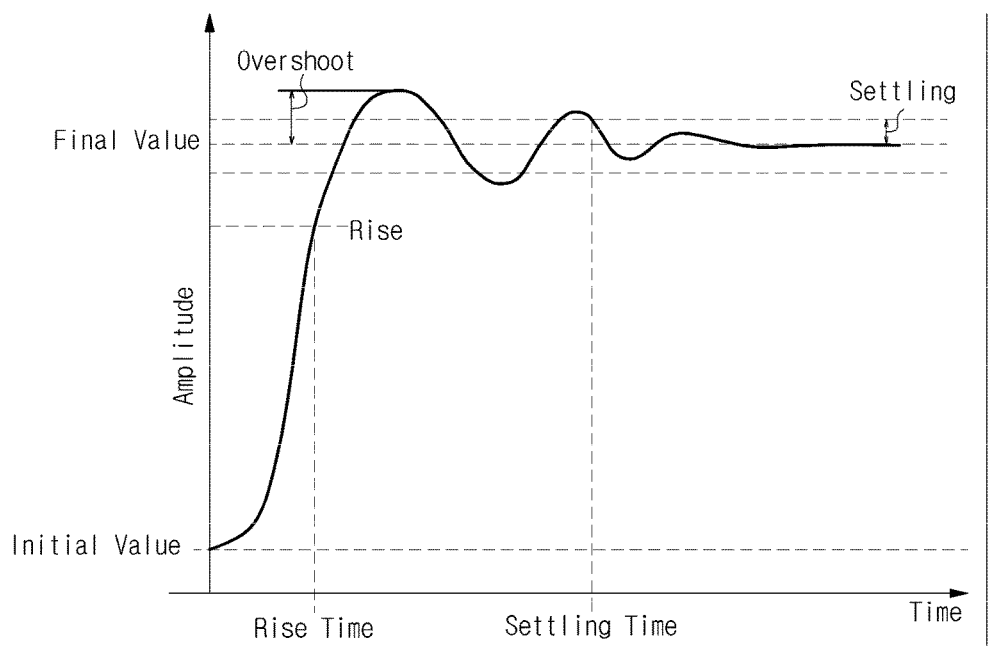
FIG. 8 is a view illustrating a time response to a step input of load torque of an motion assistive apparatus according to some example embodiments.
Figure 9:
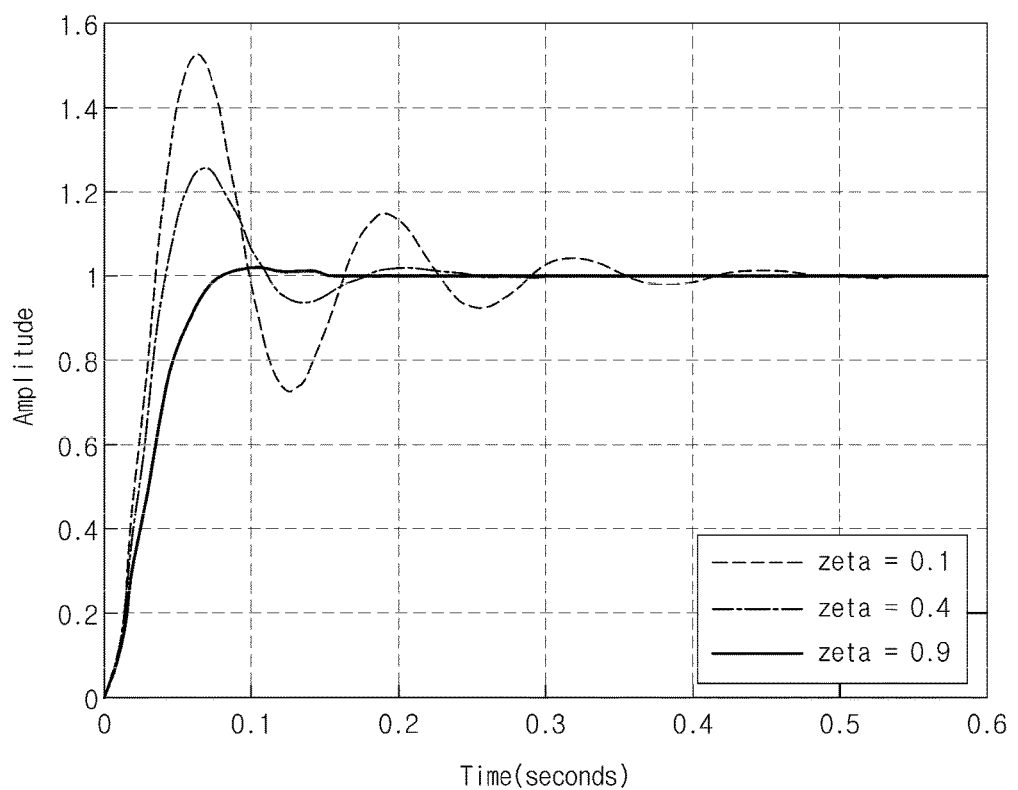
FIG. 9 is a view illustrating variation of overshoot according to damping ratio.
Figure 10:
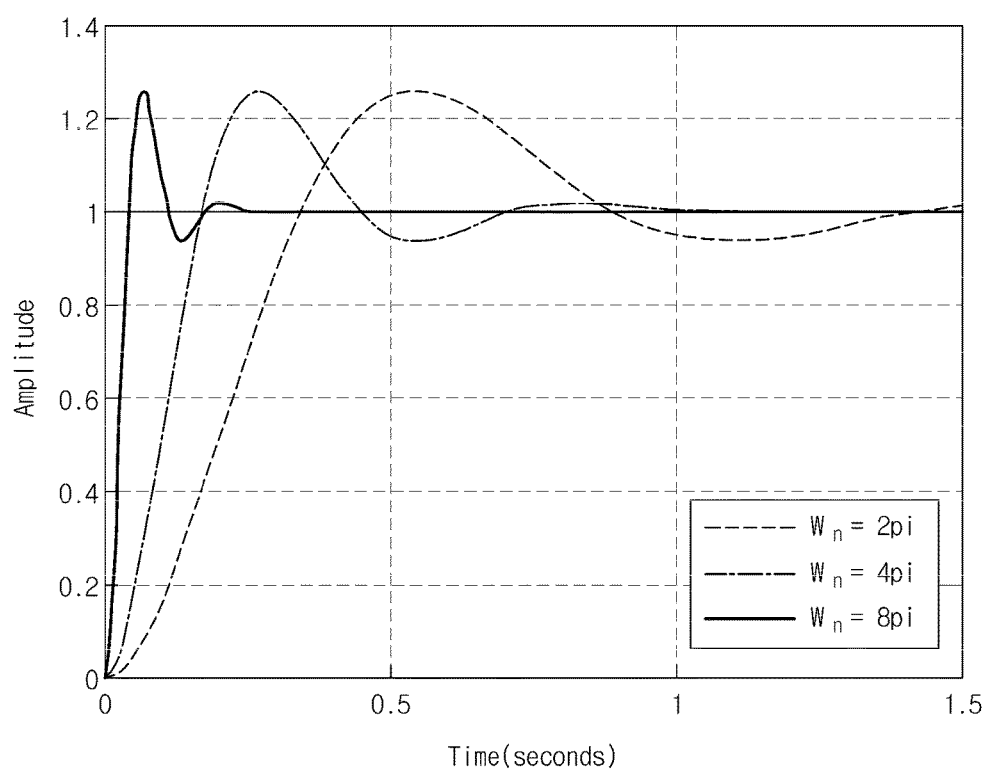
FIG. 10 is a view illustrating variation of rise time and settling time with natural frequency.

FIG. 8 is a view illustrating a time response to a step input of load torque of an motion assistive apparatus according to some example embodiments FIG. 9 is a view illustrating variation of overshoot with the damping ratio, and FIG. 10 is a view illustrating variation of rise time and settling time with natural frequency.

As shown in FIG. 8, the time response characteristics for step input of the load torque include overshoot, rise time, and settling time. These time response characteristics are associated with the variable characteristics, and thus the processor 17 may adjust the time response characteristics to adjust the variable characteristics.

For example, the magnitude of assist power, which is one of the variable characteristics is associated with overshoot of the time response characteristics, and the response speed of the motion assistive apparatus is associated with the rise time. In addition, the motion smoothness of the motion assistive apparatus is associated with the settling time.

The correlation between the variable characteristics and the time response characteristics will be more specifically described based on Equations 5-8 given below.

$$\text{Overshoot: } e^{-\pi\xi/\sqrt{1-\xi^2}} \quad \text{Equation 5}$$

$$\text{Rise Time: } 1.8/\omega_n \quad \text{Equation 6}$$

$$\text{Settling Time: } 4 \times (2\pi/\omega_n) \quad \text{Equation 7}$$

$$\xi = C/2\sqrt{MG}, \omega_n = \sqrt{G/M} \quad \text{Equation 8}$$

When overshoot increases, the magnitude of assist power also increases. As shown in Equation 5, the overshoot depends on the damping ratio, i.e., zeta.

Referring to FIG. 9, when zeta increases, the overshoot may decrease. In addition, referring to Equation 8, zeta is directly adjustable by adjusting the variable parameter C. Accordingly, when an adjustment command to increase the magnitude of the assist power is input through the receiver 50, the processor 17 may reduce the variable parameter C to increase overshoot. As shown in Equation 8, Zeta may also be reduced by decreasing C and increasing other variable parameters such as M and G.

When the rise time, one of the time response characteristics, decreases, the response speed of the motion assistive apparatus may increases. As shown in Equation 6, the rise time may depends on the natural frequency, i.e., omega.

Referring to FIG. 10, when the natural frequency increases, the rise time decreases. In addition, referring to Equation 8, it may be possible to directly adjust the natural frequency by adjusting variable parameters G and M. Accordingly, when an adjustment command to increase the response speed is input through the receiver 50, the processor 17 may reduce the variable parameter M and increases G to increase the natural frequency, thereby increasing the rise time.

When the settling time increases, motion of the motion assistive apparatus becomes smoother. As shown in Equation 7, the settling time depends on the natural frequency, i.e., omega.

Referring to FIG. 10, when the natural frequency decreases, the settling time increases. In addition, referring to Equation 8, the natural frequency may be directly adjusted by adjusting variable parameters G and M. Accordingly, when an adjustment command to enhance smoothness of motion of the motion assistive apparatus is input through the receiver 50, the processor 17 may increase the variable parameter M and decrease G to reduce the natural frequency, thereby increasing the settling time.

When a command to adjust the variable characteristics according to the settings is input through the Automatic button 53 of the receiver 50, the processor 17 may adjust the variable parameter to adjust performance of the motion assistive apparatus in order to adjust the time response characteristics according to the desired (or, alternatively, the predetermined) settings.

Once an adjustment command for the variable characteristics is input through the receiver 50, the processor 17 adjusts the variable parameters in response to the adjustment command and outputs a control signal to one or more of the actuators 21, 31, 41 to operate the actuators 21, 31, 41 according to the adjusted variable parameters. The actuators 21, 31, 41 generate torque according to the control signal output from the processor 17, thereby assisting the user in walking with the performance desired by the user.

Adjustment of the variable parameters by the processor 17 and corresponding driving of the actuator 21, 31, 41 may be performed in real time, in response to change of the adjustment command through the receiver 50.

FIG. 11 is a flowchart illustrating a method of controlling an motion assistive apparatus according to some example embodiments.

Referring to FIG. 11, in operation 500, the processor 17 receives an adjustment command for variable characteristics through the receiver 50.

The receiver 50 is provided with a user interface allowing intuitive adjustment of the variable characteristics related to the performance of the motion assistive apparatus.

As discussed above with reference to FIGS. 6 and 7, the names 51 indicating representative properties of the variable characteristics to be adjusted may be displayed on the user interface. The at least one adjustment button 52 to increase or decrease the level of each of the variable characteristics may be provided for each of the variable characteristics, or the at least one adjustment dial 54 to increase or decrease the level of each of the variable characteristics may be provided for each variable characteristics. In addition, the user interface may employ a touchscreen to adjust the variable characteristics through touch. Alternatively, the user interface may employ a voice recognition device to adjust the variable characteristics according to the user's voice command, or may employ a motion recognition device to adjust the variable characteristics by recognizing the user's motion. The user may select a user interface corresponding to a desired command input type and input a command, thereby adjusting the current level of the variable characteristics to a higher or lower level.

In operation 510, the processor 17 may adjust variable parameters in response to the adjustment command.

When the user inputs a command to adjust a desired one of the variable characteristics through the receiver 50, the processor 17 may adjusts parameters corresponding to the desired variable characteristics to adjust the variable characteristics.

The processor 17 adjusts variable parameters such as M, C and G in response to the adjustment command for the variable characteristics input through the receiver 50. The processor 17 determines variable parameter related to adjustment of the variable characteristics among the aforementioned variable parameters and adjusts the determined variable parameters to change the variable characteristics in response to the adjustment command input through the receiver 50.

For example, in adjusting the time response characteristics of the load torque in response to adjustment of the variable characteristics, the processor 17 may adjust variable parameters constituting the time response characteristics.

The time response characteristics for step input of the load torque may include overshoot, rise time, and settling time. These time response characteristics are associated with the variable characteristics, and thus the processor 17 adjusts the time response characteristics to adjust the variable characteristics.

The time response characteristics may include overshoot, rise time and settling time.

As discussed above with reference to FIG. 8, when the time response characteristic overshoot increases, the magnitude of assist power may also increase. The overshoot may depend on the damping ratio, i.e., zeta. When zeta increases, the overshoot decreases. Zeta decreases when variable parameter C decreases. Accordingly, when an adjustment command to increase the magnitude of the assist power is input through the receiver 50, the processor 17 may reduce the variable parameter C to decrease zeta. Zeta may also be reduced by decreasing C and increasing other variable parameters such as M and G.

Further, as discussed above with reference to FIG. 8, when the time response characteristic rise time decreases, the response speed of the motion assistive apparatus may increase. The rise time may depends on the natural frequency, i.e., omega. When the natural frequency increases, the rise time decreases. It may be possible to directly adjust the natural frequency by adjusting variable parameters G and M. When an adjustment command to increase the response speed is input through the receiver 50, the processor 17 may reduce the variable parameter M and increases G to increase the natural frequency, thereby increasing the rise time.

Further, as discussed above with reference to FIG. 8, when the time response characteristic settling time increases, motion of the motion assistive apparatus becomes smoother. The settling time may depends on the natural frequency, i.e., omega. when the natural frequency decreases, the settling time increases. The natural frequency may be directly adjusted by adjusting variable parameters G and M. When an adjustment command to enhance smoothness of motion of the motion assistive apparatus is input through the receiver 50, the processor 17 increases the variable parameter M and decreases G to reduce the natural frequency, thereby increasing the settling time.

In operation 520, the processor 17 may generate a control signal reflecting adjustment of the variable parameters and output the same to one or more of the actuators 21, 31, 41.

In operation 530, the actuators 21, 31, 41 generate torque corresponding to the control signal to assist the user in walking.

Once an adjustment command for the variable characteristics is input through the receiver 50, the processor 17 may adjust the variable parameters in response to the adjustment command and outputs a control signal to one or more of the actuators 21, 31, 41 to operate the actuators 21, 31, 41 according to the adjusted variable parameters. The actuators 21, 31, 41 may generate torque according to the control signal output from the processor 17, thereby assisting the user in walking with the performance desired by the user. Adjustment of the variable parameters by the processor 17 and corresponding driving of the actuators 21, 31, 41 may be performed in real time, in response to change of the adjustment command through the receiver 50.

As is apparent from the above description, the motion assistive apparatus 1 allows a user to intuitively adjust performance of an motion assistive apparatus.

Although a few example embodiments have been shown and described, it would be appreciated by those skilled in the art that changes may be made to the example embodiments without departing from the principles and spirit thereof, the scope of which is defined in the claims and their equivalents.

What is claimed is:

1. A motion assistive apparatus comprising:
   a receiver configured to receive input, the input including a requested adjustment to variable characteristics associated with torque applied to one or more joints of the motion assistive apparatus;
   a memory configured to store,
      a first correlation between the variable characteristics and time response characteristics of the torque, the variable characteristics including a magnitude of an assist power, a response speed of the motion assistive apparatus and a motion smoothness of the motion assistive apparatus, the time response characteristics including an overshoot, a rise time, and a settling time, and
      a second correlation between the time response characteristics and one or more variable parameters, the one or more variable parameters including mass, Coriolis force and gravitational force;
   a processor configured to, in response to the input,
      select selected variable parameters from among one or more of the variable parameters based on the first correlation and the second correlation,
      adjust the selected variable parameters to generate an adjusted selected variable parameters by increasing or decreasing the selected variable parameters based on the requested adjustment to the variable characteristics, and
      adjust the time response characteristics by adjusting intermediate characteristics based on the adjusted selected variable parameters, the intermediate characteristics including one or more of damping ratio and natural frequency; and
   an actuator configured to output the assist power in response to the adjustment of the one or more variable parameters.

2. The motion assistive apparatus according to claim 1, wherein the variable characteristics comprises:
   at least one of the magnitude of the assist power, the response speed of the motion assistive apparatus, and the motion smoothness of the motion assistive apparatus.

3. The motion assistive apparatus according to claim 1, wherein the one or more variable parameters comprises:
   at least one of parameters reflecting the mass, the Coriolis force and the gravitational force varying according to rotation of the one or more joints.

4. The motion assistive apparatus according to claim 1, wherein the processor is configured to adjust the overshoot of the time response characteristics in response to the input requesting an adjustment of the magnitude of the assist power.

5. The motion assistive apparatus according to claim 1, wherein the processor is configured to adjust the rise time of the time response characteristics in response to the input requesting an adjustment of the response speed of the motion assistive apparatus.

6. The motion assistive apparatus according to claim 1, wherein the processor is configured to adjust the settling time of the time response characteristics in response to the input requesting an adjustment of the motion smoothness of the motion assistive apparatus.

7. The motion assistive apparatus according to claim 1, wherein the processor is configured to adjust variable parameters that reflect the Coriolis force varying according to rotation of the one or more joints in response to the input requesting adjustment of the magnitude of the assist power.

8. The motion assistive apparatus according to claim 1, wherein the processor is configured to adjust one or more of variable parameters that reflect one of the mass varying according to rotation of the one or more joints and variable parameter that reflects the gravitational force varying according to rotation of the one or more joints among the one or more variable parameters in response to the input requesting adjustment of the response speed of the motion assistive apparatus.

9. The motion assistive apparatus according to claim 1, wherein the processor is configured to adjust one or more of variable parameters that reflect the mass varying according to rotation of the one or more joints and variable parameter that reflect gravitational force varying according to rotation of the one or more joints among the one or more variable parameters in response to the input requesting adjustment of the motion smoothness of the motion assistive apparatus.

10. The motion assistive apparatus according to claim 1, wherein the receiver comprises:
    a button, the button configured to generate a command to instruct the processor to automatically adjust the variable characteristics according to the first correlation and the second correlation, wherein the processor is configured to adjust the one or more variable parameters related to at least one of the magnitude of the assist power, the response speed of the motion assistive apparatus, and the motion smoothness of the motion assistive apparatus among the variable characteristics, based on the command.

11. A method of controlling a motion assistive apparatus comprising:
    receiving, via a receiver, an adjustment command to including a requested adjustment to variable characteristics associated with torque applied to one or more joints of the motion assistive apparatus;
    reading, from a memory, a first correlation between the variable characteristics and time response characteristics of the torque, the variable characteristics including a magnitude of an assist power, a response speed of the motion assistive apparatus and a motion smoothness of the motion assistive apparatus, the time response characteristics including an overshoot, a rise time, and a settling time;

reading, from the memory, a second correlation between the time response characteristics and one or more variable parameters, the one or more variable parameters including mass, Coriolis force and gravitational force;

selecting, using a processor, selected variable parameters from among one or more of the variable parameters based on the first correlation and the second correlation;

adjusting, using the processor, the selected variable parameters to generate an adjusted selected variable parameters by increasing or decreasing the selected variable parameters based on the requested adjustment to the variable characteristics;

adjusting, using the processor, the time response characteristics by adjusting intermediate characteristics based on the adjusted selected variable parameters, the intermediate characteristics including one or more of damping ratio and natural frequency; and outputting the assist power in response to the adjustment of the one or more variable parameters.

12. The method according to claim 11, wherein the adjusting of the one or more variable parameters comprises:
adjusting variable parameters that reflect the Coriolis force varying according to rotation of the one or more joints in response to the adjustment command requesting adjustment of the magnitude of the assist power.

13. The method according to claim 11, wherein the adjusting of the one or more variable parameters comprises:
adjusting one or more of variable parameters that reflect the mass varying according to rotation of the one or more joints and a variable parameter that reflects the gravitational force varying according to rotation of the one or more joints among the one or more variable parameters in response to the adjustment command requesting adjustment of the response speed of the motion assistive apparatus.

14. The method according to claim 11, wherein the adjusting of the one or more variable parameters comprises:
adjusting one or more of variable parameters that reflect the mass varying according to rotation of the one or more joints and variable parameter that reflects the gravitational force varying according to rotation of the one or more joints among the one or more variable parameters in response to the adjustment command requesting adjustment of the motion smoothness of the motion assistive apparatus.

15. The method according to claim 11, wherein the adjusting of the time response characteristics comprises:
adjusting the overshoot of the time response characteristics in response to the adjustment command requesting the adjustment of the magnitude of the assist power.

16. The method according to claim 11, wherein the adjusting of the time response characteristics comprises:
adjusting the rise time of the time response characteristics in response to the adjustment command requesting the adjustment of the response speed of the motion assistive apparatus.

17. The method according to claim 11, wherein the adjusting of the time response characteristics comprises:
adjusting the settling time of the time response characteristics in response to the adjustment command requesting an adjustment of the motion smoothness of the motion assistive apparatus.

18. A motion assistive apparatus configured to generate an assist power to assist a user thereof with walking, the motion assistive apparatus comprising:

a memory configured to store,
a first correlation between variable characteristics and time response characteristics of a torque, the variable characteristics including a magnitude of the assist power, a response speed of the motion assistive apparatus and a motion smoothness of the motion assistive apparatus, the time response characteristics including an overshoot, a rise time, and a settling time, and
a second correlation between the time response characteristics and one or more variable parameters, the one or more variable parameters including mass, Coriolis force and gravitational force; and a processor configured to, in response to an input received from the user, the input including a requested adjustment to variable characteristics associated with the torque applied to one or more joints of the motion assistive apparatus,
select selected variable parameters from among one or more of the variable parameters based on the first correlation and the second correlation,
adjust the selected variable parameters to generate an adjusted selected variable parameters by increasing or decreasing the selected variable parameters based on the requested adjustment to the variable characteristics, and
adjust time response characteristics by adjusting intermediate characteristics based on the adjusted selected variable parameters, the intermediate characteristics including one or more of damping ratio and natural frequency.

19. The motion assistive apparatus of claim 18, wherein the torque is applied to one or more joints of the motion assistive apparatus by an actuator.

20. The motion assistive apparatus of claim 19, wherein the variable characteristics include at least one of the magnitude of the assist power, the response speed of the motion assistive apparatus, and the motion smoothness of the motion assistive apparatus.

21. The motion assistive apparatus of claim 20, wherein the processor is configured to,
adjust the overshoot associated with the torque, in response to the input requesting an adjustment in the magnitude of the assist power,
adjust the rise time associated with the torque, in response to the input requesting an adjustment of the response speed, and
adjust the settling time associated with the torque, in response to the input requesting an adjustment of the motion smoothness.

22. The motion assistive apparatus of claim 19, wherein the torque applied to the one or more joints is a function of at least the mass varying according to a pose of the user, the Coriolis force applied to the joints according to rotation of legs of the user, and the gravitational force, and
the processor is configured to adjust, based on the input, one or more of the mass, the Coriolis Force and the gravitational force.

23. The motion assistive apparatus of claim 18, further comprising:
a receiver configured to receive the input from the user.

24. The motion assistive apparatus of claim 18, further comprising:
a walking assistive device having an exoskeleton shape such that the walking assistance device is configured to be worn on one or more legs of the user, the walking assistive device including an actuator configured to provide the assist power to joints of the walking assistive device based on a control signal generated by the processor.

* * * * *